Dec. 27, 1960 R. FAVRE 2,966,614

INDICATING DEVICE FOR ELECTRONIC COUNTERING CIRCUITS

Filed Aug. 25, 1959 3 Sheets-Sheet 1

2,966,614

INDICATING DEVICE FOR ELECTRONIC COUNTERING CIRCUITS

Robert Favre, Lausanne, Switzerland, assignor to Fabriques Movado, Neuchatel, Switzerland, a firm of Switzerland Filed Aug. 25, 1959, Ser. No. 835,933

Claims priority, application Switzerland Aug. 27, 1958

13 Claims. (Cl. 315—132)

The present invention relates to an indicating device using high voltage gas discharge tubes having a low current consumption. The indicating device is for use with electronic counters, scalers and similar apparatus working with low voltage impulses.

The majority of electronic apparatus of this type employs bistable or flip-flop stages. The principle of a bistable binary stage depends on the coupling of two thermionic tubes or transistors in such a fashion that the one is made non-conducting when the other is conducting. There are thus two stable states and $n$ such stages connected in cascade constitute a counter of capacity $2^n$. Adaptations can be made to use binary stages to obtain decimal numeration.

The known indicating devices for use with this type of circuit usually comprise two gas discharge tubes, neon tubes, for example, of low current consumption which are linked to the anode resistances of electronic valves on the collectors of transistors.

Unfortunately these tubes cannot be directly fed from transistorized circuits functioning with impulses of a few volts as the tubes do not light up below a potential difference of about 100 volts.

The invention consists in an indicating device for electronic counters, scalers and the like, a stage of an electronic counter circuit having two outputs arranged to selectively carry a relatively low voltage, at least one magnetic amplifier having a control winding connected to one of said outputs, a primary winding fed from a source of periodic current, and a secondary winding, and at least one gas discharge tube operating at a relatively high voltage, said gas discharge tube being connected to the outputs of said secondary winding, whereby the state of the said circuit stage determines an induced voltage in the secondary winding and causes illumination or extinction of one of the gas discharge tubes.

The accompanying drawings represent three embodiments of the invention for example only.

Figure 1:
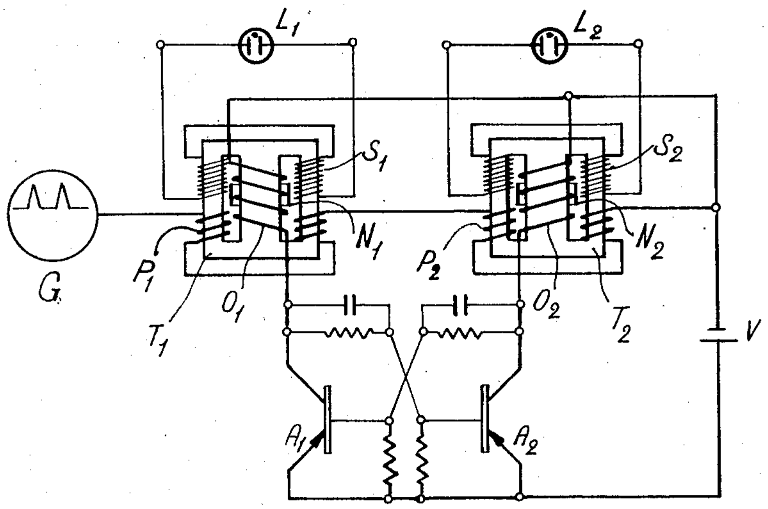
Figure 1 is a circuit diagram of the first embodiment.

The indicating device of Figure 1 comprises two transformers $T_1$ and $T_2$, an impulse generator and two gas discharge tubes $L_1$ and $L_2$. The two transformers $T_1$ and $T_2$ are identical and each comprises three-legged saturable cores having a primary winding $P_1$ ($P_2$), a secondary winding $S_1$ ($S_2$) and a control winding $O_1$ ($O_2$).

The primary and secondary windings are each wound in two sections on the outer legs of the transformer cores for the sake of flux equilibrium. The primary and the secondary windings are connected in series with an impulse generator G and to the discharge tubes $L_1$ and $L_2$ respectively.

The control windings $O_1$ ($O_2$) forming the load resistances of two transistors $A_1$ and $A_2$ are wound on the central legs of the transformers.

Two short-circuiting rings $N_1$ ($N_2$) are coaxially placed around the central legs of the transformer cores to reduce self induction of the windings $O_1$ and $O_2$.

The device functions as follows.

Figure 2:
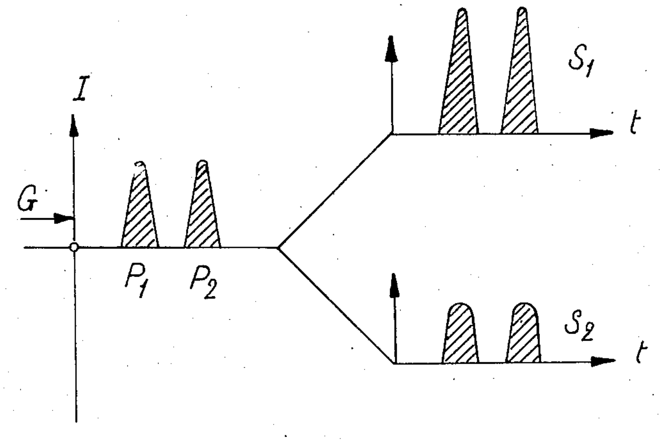
Figure 2 is an explanatory diagram.

When the transistor $A_1$ is conducting and the transistor $A_2$ non-conducting, the core of the transformer $T_1$ is saturated and the impulses from the generator G impressed on the primary $P_1$, as shown in Figure 2, only induce impulses of reduced value in the secondary winding $S_1$ which are insufficient to operate the discharge tube $L_1$.

On the other hand the core of the transformer $T_2$ is not saturated and the impulses impressed on its primary winding $P_2$ create amplified impulses in the secondary winding $S_2$. Their amplitude is sufficient to operate the discharge tube $L_2$.

When the bistable counter circuit is triggered and passes into its other stable condition, i.e. with the transistor $A_2$ conducting and the transistor $A_1$ non-conducting, the impulses generated in the secondary winding $S_1$ are insufficient to operate the discharge tube $T_1$ while those generated in the secondary winding $S_2$ operate the discharge tube $L_2$. It follows that in a change of the counter circuit from one stable state to the other, one of the discharge tubes lights up and the other goes out.

Figure 3:
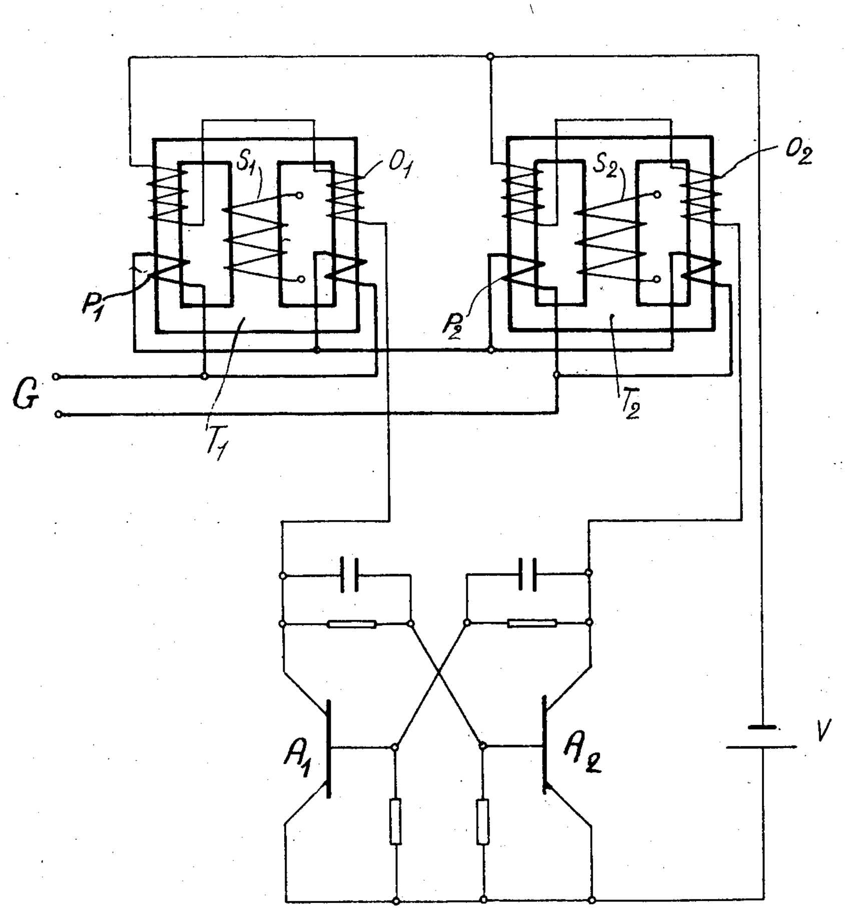
Figures 3 and 4 are circuit diagrams of two further embodiments.

In the further embodiment of Figure 3, the secondary windings $S_1$ and $S_2$ are wound on the central legs of the transformer cores while the control windings $O_1$ and $O_2$ are on the outer legs. This arrangement enables the total number of turns to be reduced.

It is to be noted that the total impedance of the primary windings is constant as the cores are never simultaneously saturated. If the ferrite cores, for example, are used, the transformers need only be a few millimeters in size.

Figure 4:
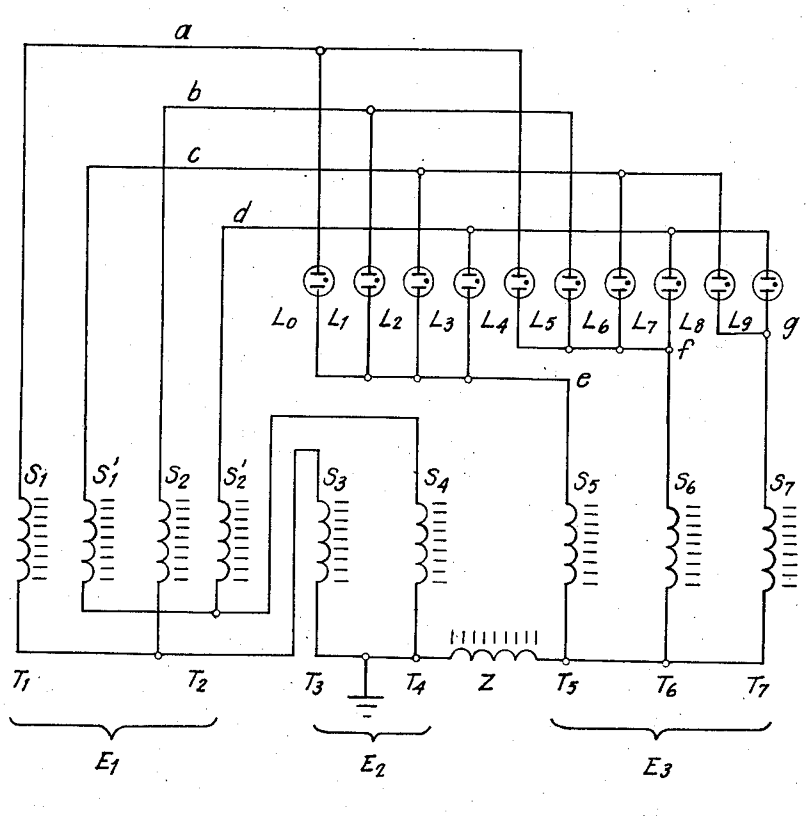

Figure 4 shows a part of an indicating device of a decade counter for direct reading from ten discharge tubes $L_0$ to $L_9$.

This counter comprises two binary stages $E_1$ and $E_2$ and a ternary stage $E_3$. The two binary stages each comprise two transformers $T_1$ and $T_2$ ($T_3$ and $T_4$) while the ternary stage has three transformers $T_5$, $T_6$ and $T_7$. All these transformers have saturable cores as in the embodiment of Figures 1 and 3. In order to simplify the drawing only the secondary windings of the transformers are shown. The two stable states of the binary stages are determined by the saturation of one or the other of the transformer cores. The three states of the ternary stage are determined by the saturation of two of the three transformer cores. The numbers 0 to 9 are determined by the following combinations:

| | $T_1$ | $T_2$ | $T_3$ | $T_4$ | $T_5$ | $T_6$ | $T_7$ |
|---|---|---|---|---|---|---|---|
| 0 | *n* | *s* | *n* | *s* | *n* | *s* | *s* |
| 1 | *s* | *n* | *n* | *s* | *n* | *s* | *s* |
| 2 | *n* | *s* | *s* | *n* | *n* | *s* | *s* |
| 3 | *s* | *n* | *s* | *n* | *n* | *s* | *s* |
| 4 | *n* | *s* | *n* | *s* | *s* | *n* | *s* |
| 5 | *s* | *n* | *n* | *s* | *s* | *n* | *s* |
| 6 | *n* | *s* | *s* | *n* | *s* | *n* | *s* |
| 7 | *s* | *n* | *s* | *n* | *s* | *n* | *s* |
| 8 | *n* | *s* | *s* | *n* | *s* | *s* | *n* |
| 9 | *s* | *n* | *s* | *n* | *s* | *s* | *n* |

The saturated and non-saturated states of the transformer cores are indicated by *s* and *n* respectively.

The transformers $T_1$ and $T_2$ of the stage $E_1$ each have two secondary windings $S_1$ and $S_1'$, and $S_2$ and $S_2'$, respectively, in series with the secondary windings $S_3$ and $S_4$ of the transformers $T_3$ and $T_4$ of the binary stage $E_2$. The secondary windings $S_1$, $S_1'$, $S_2$ and $S_2'$ are connected by four leads *a*, *b*, *c* and *d* with the upper electrodes of the discharge tubes $L_0$ and $L_4$; $L_1$ and $L_5$; $L_2$, $L_6$ and $L_8$; and $L_7$ and $L_9$. The lower electrodes of the tubes $L_0$, $L_1$, $L_2$ and $L_3$ are connected by a lead *e* with the secondary winding $S_5$; those of the tubes $L_4$, $L_5$, $L_6$ and $L_7$ are connected by a lead $f$ to the secondary winding $S_6$, while the lower electrodes of the tubes $L_8$ and $L_9$ are connected by a lead $g$ to the secondary winding $S_7$. These latter three secondary windings are grounded through an impedance Z to limit the current following through the gas discharge tubes.

Each tube is in series with three secondary windings so that impulse developed in them are added together. These windings are made in such a fashion that the corresponding tube is only lit up when "amplified" impulses are developed in all three of them. If two impulses only are "amplified" and one is reduced, the tube is not lit up.

The following table, in which $x$ represents an "amplified" impulse and $o$ a "reduced" impulse shows, together with the preceding table, the order of operation of the discharge tubes.

| | $T_1$ | | $T_2$ | | $T_3$ | $T_4$ | $T_5$ | $T_6$ | $T_7$ |
|---|---|---|---|---|---|---|---|---|---|
| | $S_1$ | $S_1'$ | $S_2$ | $S_2'$ | $S_3$ | $S_4$ | $S_5$ | $S_6$ | $S_7$ |
| $L_0$ ($S_3$, $S_1$, $S_5$) | $x$ | $x$ | $o$ | $o$ | $x$ | $o$ | $x$ | $o$ | $o$ |
| $L_1$ ($S_3$, $S_2$, $S_5$) | $o$ | $o$ | $x$ | $x$ | $x$ | $o$ | $x$ | $o$ | $o$ |
| $L_2$ ($S_4$, $S_1$, $S_5$) | $x$ | $x$ | $o$ | $o$ | $o$ | $x$ | $x$ | $o$ | $o$ |
| $L_3$ ($S_4$, $S_2'$, $S_5$) | $o$ | $o$ | $x$ | $x$ | $o$ | $x$ | $x$ | $o$ | $o$ |
| $L_4$ ($S_3$, $S_1$, $S_6$) | $x$ | $x$ | $o$ | $o$ | $x$ | $o$ | $o$ | $x$ | $o$ |
| $L_5$ ($S_3$, $S_2$, $S_6$) | $o$ | $o$ | $x$ | $x$ | $x$ | $o$ | $o$ | $x$ | $o$ |
| $L_6$ ($S_4$, $S_1'$, $S_6$) | $x$ | $x$ | $o$ | $o$ | $o$ | $x$ | $o$ | $x$ | $o$ |
| $L_7$ ($S_4$, $S_2'$, $S_6$) | $o$ | $o$ | $x$ | $x$ | $o$ | $x$ | $o$ | $x$ | $o$ |
| $L_8$ ($S_3$, $S_1'$, $S_7$) | $x$ | $x$ | $o$ | $o$ | $o$ | $x$ | $o$ | $o$ | $x$ |
| $L_9$ ($S_4$, $S_2'$, $S_7$) | $o$ | $o$ | $x$ | $x$ | $o$ | $x$ | $o$ | $o$ | $x$ |

The transformers, therefore, used in embodiments of the invention described, replace the load and coupling resistances of the usual type of counter.

The generator G (not represented in Figure 4) can be arranged so as to use the saturable transformers as a reactive circuit. In this case an additional transistor is used for feeding the primary windings of the saturable transformers.

The apparatus for operating gas discharge tubes from transistorized bistable circuits functioning with a potential of the order of one volt, can be made cheaply. The source of current V (in Figure 1) can, for example, be an accumulator of the sealed alkaline type. The efficiency of the apparatus is so high that the consumption for a ten-tube counter is about 30 mw.

The device of the invention is not limited to the embodiments described and illustrated. Particularly, the voltages induced in the secondary windings of the transformers could also be obtained by the rapid cutting off of a current impressed on the primaries for a comparatively long time.

Furthermore, an embodiment could be taken into account which uses one transformer only, the gas discharge tube being lighted up or cut off according to the condition of the corresponding stage. In this case, the primary winding of the transformer would be placed in series with a relatively high impedance so as to keep the total impedance nearly constant.

In certain cases, a common winding for the primary and the secondary could also be taken into account, e.g. in the case stated above where the inducing current increases slowly and is then cut off rapidly. In the latter case, the impulsion induced by self-induction could be sufficient to operate the lighting up of a lamp.

The uses of the device of the invention are not limited to transistorized circuits but would be of considerable interest with a counter with thermionic valves whose anode potentials are limited to a low value, e.g. in order to operate at a high frequency.

Finally, the device of the invention can be employed in an electronic clock circuit with any timing rate operating from a source of radio-activity, an oscillator or the like. In this case, it is preferred to use discharge tubes having a common anode and superimposed cathodes taking the shape of figures for indicating successively hours, minutes, and seconds.

What I claim is:

1. In an indicating device for electronic counters, scalers and the like, the combination of a magnetic amplifier, a primary and a secondary winding for said amplifier, a circuit fed with alternating current feeding the primary winding, indicating means fed by the secondary winding operatively connected with the said secondary winding, a control winding independent of the primary and secondary windings, an electronic counter circuit feeding said control winding, whereby the condition of said counter circuit modifies through said control winding the magnetic condition of the amplifier to thereby induce the voltage in the secondary winding to modify the illuminated condition of the indicating means.

2. In an indicating device for electronic counters, scalers and the like, the combination of a magnetic amplifier, a primary and a secondary winding for said amplifier, a circuit fed with alternating current feeding the primary winding, at least one gas discharge tube operating upon increase in the voltage, electrically connected with the secondary winding, a control winding independent of the primary and secondary windings, means adapted to reduce the self induction coefficient of said control winding, an electronic counter circuit feeding said control winding whereby the condition of said counter circuit modifies through said control winding the magnetic condition of the amplifier to thereby induce voltage in the secondary winding to modify the illuminated condition of at least one gas discharge tube.

3. In an indicating device for electronic counters, scalers and the like, the combination of a magnetic amplifier, a primary and a secondary winding for said amplifier, a circuit fed with alternating current feeding the primary winding, at least one gas discharge tube operating upon increase in voltage electrically connected with the secondary winding, a control winding independent of the primary and secondary windings, a short-circuiting ring surrounding the control winding and adapted to reduce the self induction coefficient of said control winding, an electronic counter circuit feeding said control winding whereby the condition of said counter circuit modifies through said control winding the magnetic condition of the amplifier to thereby induce voltage in the secondary winding to modify the illuminated condition of at least one gas discharge tube.

4. In an indicating device for electronic counters, scalers and the like, the combination of a magnetic amplifier, a primary and a secondary winding, for said amplifier, a circuit fed with alternating current feeding the primary winding, indicating means electrically connected with the secondary winding and constituted by at least one gas discharge tube operating at a higher voltage, means limiting the current fed by the secondary winding into the gas discharge tubes, a control winding independent of the primary and secondary windings, an electronic counter circuit feeding said control winding, whereby the condition of said counter circuit modifies through said control winding the magnetic condition of the amplifier to thereby induce voltage in the secondary winding to modify the illuminated condition of at least one gas discharge tube.

5. In an indicating device for electronic counters, scalers and the like, the combination of a magnetic amplier, a primary and a secondary winding for said amplifier, a circuit fed with alternating current feeding the primary winding, in a substantially permanent manner, indicating means constituted by at least one gas discharge tube operating upon increase in voltage electrically connected with the secondary winding, an electronic counter circuit feeding said control winding, whereby the condition of said counter circuit cuts off suddenly the current fed to the primary winding to thereby induce voltage in the secondary winding to modify the illuminated condition of at least one gas discharge.

6. In an indicating device for electronic counters, scalers and the like, the combination of a magnetic amplifier, a primary and a secondary winding for said amplifier, a circuit fed with alternating current feeding the primary winding, means for maintaining the impedance of said primary winding circuit at a substantially constant value, indicating means constituted by at least one gas discharge tube operating upon increase in voltage, electrically connected with the secondary winding, a control winding independent of the primary and secondary windings, an electronic counter circuit feeding said control winding whereby the condition of said counter circuit modifies through said control winding the magnetic condition of the amplifier to thereby induce voltage in the secondary winding to modify the illuminated condition of at least one gas discharge tube.

7. In an indicating device for electronic counters, scalers and the like, the combination of a magnetic amplifier, a primary winding and a secondary winding tapped off the primary winding for said amplifier, a circuit fed with alternating current feeding the primary winding, indicating means constituted by at least one gas discharge tube operating upon increase in voltage, electrically connected with the secondary winding, a control winding independent of the primary and secondary windings, an electronic counter circuit feeding said control winding, whereby the condition of said counter circuit modifies through said control winding the magnetic condition of the amplifier to thereby induce voltage in the secondary winding to modify the illuminated condition of at least one gas discharge tube.

8. An electronic indicating device for electronic counters, scalers and the like, comprising a magnetic amplifier including at least two three-armed cores, a primary winding wound over two arms of each core, a circuit of alternating current feeding permanently said winding, a secondary winding wound over each core, at least one gas discharge tube adapted to be fed by the higher voltage induced in the secondary winding of each core, a control winding for each magnetic amplifier independent of the primary and secondary windings, an electronic counter circuit feeding said control winding whereby the condition of said counter circuit induces a voltage in the secondary of each core to modify the magnetic condition of the magnetic amplifier and thereby the energization of the secondary winding and the illuminated condition of at least one of the corresponding discharge tubes.

9. In an indicating device for electronic counters, scalers and the like, the combination of a magnetic amplifier, a primary and a secondary winding for said amplifier, a circuit fed with alternating current feeding the primary winding, in a substantially permanent manner, indicating means constituted by at least one gas discharge tube operating at a higher voltage, electrically connected with the secondary winding, means for cutting suddenly off the current in the primary winding to modify the magnetic condition of the amplifier to thereby induce voltage in the secondary winding to modify the illuminated condition of at least one gas discharge tube, and electronic means controlling last-mentioned means.

10. An electronic indicating device for electronic counters, scalers and the like, comprising a magnetic amplifier including at least two three-armed cores, a primary winding wound over two arms of each core, a circuit of alternating current feeding permanently said primary windings, means coupling the primary windings to provide a constant total impedance for said primary winding circuit, a secondary winding wound over each core, at least one gas discharge tube adapted to be fed by the higher voltage induced in the secondary winding of each core, a control winding for each magnetic amplifier independently of the primary and secondary windings, an electronic counter circuit feeding said control windings whereby the condition of said counter circuit induces a voltage in the secondary of each core to modify the magnetic condition of the magnetic amplifier and thereby the energization of the secondary winding and the illuminated condition of at least one of the corresponding discharge tubes.

11. An electronic indicating device for electronic counters, scalers and the like, comprising a magnetic amplifier including at least two three-armed saturable cores, a primary winding wound over two arms of each core, a circuit of alternating current feeding permanently said primary windings, a secondary winding wound over each core, at least one gas discharge tube adapted to be fed by the higher voltage induced in the secondary winding of each core, a control winding for each magnetic amplifier independently of the primary and secondary windings, an electronic counter circuit provided with two outputs, said control windings being selectively energizable from a selected one of the outputs of the counter circuit, to saturate the corresponding magnetic amplifier to thereby vary the voltage fed by the secondary winding thereof under the action of the energized output and modify the illuminated condition of the discharge tubes.

12. In combination with an electronic flip-flop counter circuit with two outputs, the combination of a magnetic amplifier including two magnetic cores, a primary winding wound over each core, a supply of alternating current feeding permanently the two primary windings, a secondary winding wound over each core, a gas discharge tube fed by each secondary winding, a control winding on each core, independent of the primary and secondary windings, and fed selectively, by the two outputs of counter circuits, and adapted to saturate when energized, the corresponding core and thereby make the primary windings induce different voltages in the secondary windings, causing illumination of only one of the gas discharge tubes.

13. An electronic indicating device for electronic counters, scalers and the like, comprising a magnetic amplifier including at least two three-armed cores, a primary winding wound over two arms of each core, a circuit of alternating current feeding premanently said primary winding, a secondary winding wound over each core, a gas discharge tube electrically connected with at least two secondary windings, a control winding for each magnetic amplifier independently of the primary and secondary windings, an electronic counter circuit feeding said control windings whereby the condition of said counter circuit induces a voltage in the secondary of each core to modify the magnetic condition of the magnetic amplifier and thereby the energization of the secondary windings and to illuminate that discharge tube which is simultaneously energized by all the secondary windings connected with it.

References Cited in the file of this patent

UNITED STATES PATENTS

| | | |
|---|---|---|
| 2,697,178 | Isborn | Dec. 14, 1954 |
| 2,772,410 | Logue et al. | Nov. 27, 1956 |
| 2,822,480 | Isborn | Feb. 4, 1958 |
| 2,848,628 | Altschul | Aug. 19, 1958 |
| 2,851,677 | Crooks | Sept. 9, 1958 |
| 2,869,000 | Bruce | Jan. 13, 1959 |